United States Patent

Johnson

[15] 3,663,118
[45] May 16, 1972

[54] TURBINE COOLING CONTROL

[72] Inventor: Douglas Johnson, Indianapolis, Ind.

[73] Assignee: General Motors Corporation, Detroit, Mich.

[22] Filed: June 1, 1970

[21] Appl. No.: 42,351

[52] U.S. Cl. .......................................... 415/116, 415/147
[51] Int. Cl. ................................. F01d 25/12, F04d 27/00
[58] Field of Search .................. 415/110, 115, 116, 149, 147; 416/95, 97

[56] References Cited

UNITED STATES PATENTS

| | | | |
|---|---|---|---|
| 3,367,628 | 2/1968 | Fitton | 415/160 |
| 3,471,126 | 10/1969 | Abild | 415/110 |
| 3,558,237 | 1/1971 | Wall, Jr. | 415/115 |
| 3,563,669 | 2/1971 | Hockert et al. | 415/115 |
| 2,603,453 | 7/1952 | Sollinger | 416/97 |

FOREIGN PATENTS OR APPLICATIONS

| | | | |
|---|---|---|---|
| 1,012,909 | 12/1965 | Great Britain | 415/116 |

Primary Examiner—Henry F. Raduazo
Attorney—Paul Fitzpatrick and Jean L. Carpenter

[57] ABSTRACT

The turbine of a gas turbine engine has a nozzle with variable stagger angle vanes including stems which rotate with the vanes. Cooling air is supplied to the turbine from the compressor of the engine through a ring of rotary plug valves of which the movable valve members are on the vane stems. The cooling air is impelled by a fan on the turbine rotor forward face and the discharge from the fan is divided between the nozzle vanes and the turbine blades.

7 Claims, 3 Drawing Figures

INVENTOR.
Douglas Johnson
BY
Paul Fitzpatrick
ATTORNEY

TURBINE COOLING CONTROL

DESCRIPTION

My invention relates to high temperature turbines, particularly gas turbines, and relates to improvements of in the supply of cooling medium, preferably air, to such turbines. The invention is primarily directed to an improvement in the control of the supply of cooling air to a turbine with variable nozzle vanes such that the cooling air is controlled by the same input that establishes the vane stagger angle. More particularly, the cooling air is controlled by valves which are moved with the turbine nozzle vanes as the stagger angle is changed. Secondarily, the invention involves an improvement in the means for pumping the cooling air and distributing it between the stator and rotor of the turbine stage.

The principal objects of my invention are to improve the operation and reliability of gas turbine engines; to provide for more efficient cooling of such engines; and to provide an improved control of the supply of cooling fluid which minimizes waste of the cooling fluid and resulting loss of efficiency of the engine. A further object is to provide a simple and reliable means of modulating the flow of cooling fluid to a turbine in accordance with the need for cooling fluid as evidenced by the stagger angle of the turbine nozzle vanes.

By way of introduction to the description of the preferred embodiment of the invention, it may be pointed out that it is embodied in a turbine having hollow nozzle vanes and rotor blades; having means for varying the stagger angle of the nozzle vanes; and having an impeller or fan on the rotor for pumping the cooling air to the nozzle vanes and rotor blades. It incorporates a number of rotary plug type valves fixed to the nozzle vanes so that the flow of air through the valves varies with the nozzle vane setting which provides an input indicative of the requirement for cooling air.

In the preferred embodiment of the invention, means are provided on the rotor for dividing the cooling air, after its passage through the valves and fan, between the nozzle and the rotor. A feature of the invention is its adaptability to incorporation in gas turbine engines of normal types in the present state of the art without radical modification of engine structure.

It may help to put my invention in proper perspective to refer to some prior disclosures. Fans on turbine rotors for circulating cooling air are shown by Rateau U.S. Pat. No. 1,368,751 for Means for Cooling Turbine-Rotors, Feb. 15, 1921, and Whittle U.S. Pat. No. 2,434,134 for Cooling Means for Internal-Combustion Turbine Wheels of Jet Propulsion Engines, Jan. 6, 1948. Valves to control turbine cooling air are disclosed in Broffitt U.S. Pat. No. 2,811,833 for Turbine Cooling, Nov. 5, 1957, and Durkin U.S. Pat. No. 2,896,906 for Turbine Cooling Air Metering System, July 28, 1959. Variable stagger angle turbine nozzles are shown by Feilden U.S. Pat. No. 2,651,492 for Turbines, Sept. 8, 1953, and Wall U.S. Pat. No. 3,558,237 for Variable Turbine Nozzles, Jan. 26, 1971. The Wall patent also illustrates provision for circulating the cooling air to the turbine nozzle and into the turbine nozzle vanes. However, as may be gathered from the preceding summary of my invention, it involves arrangements and combinations of structure not previously known so far as I am aware.

The nature and advantages of my invention, as outlined above, will be more clearly apparent from the succeeding detailed description and accompanying drawings of the preferred embodiment of the invention.

Figure 1:
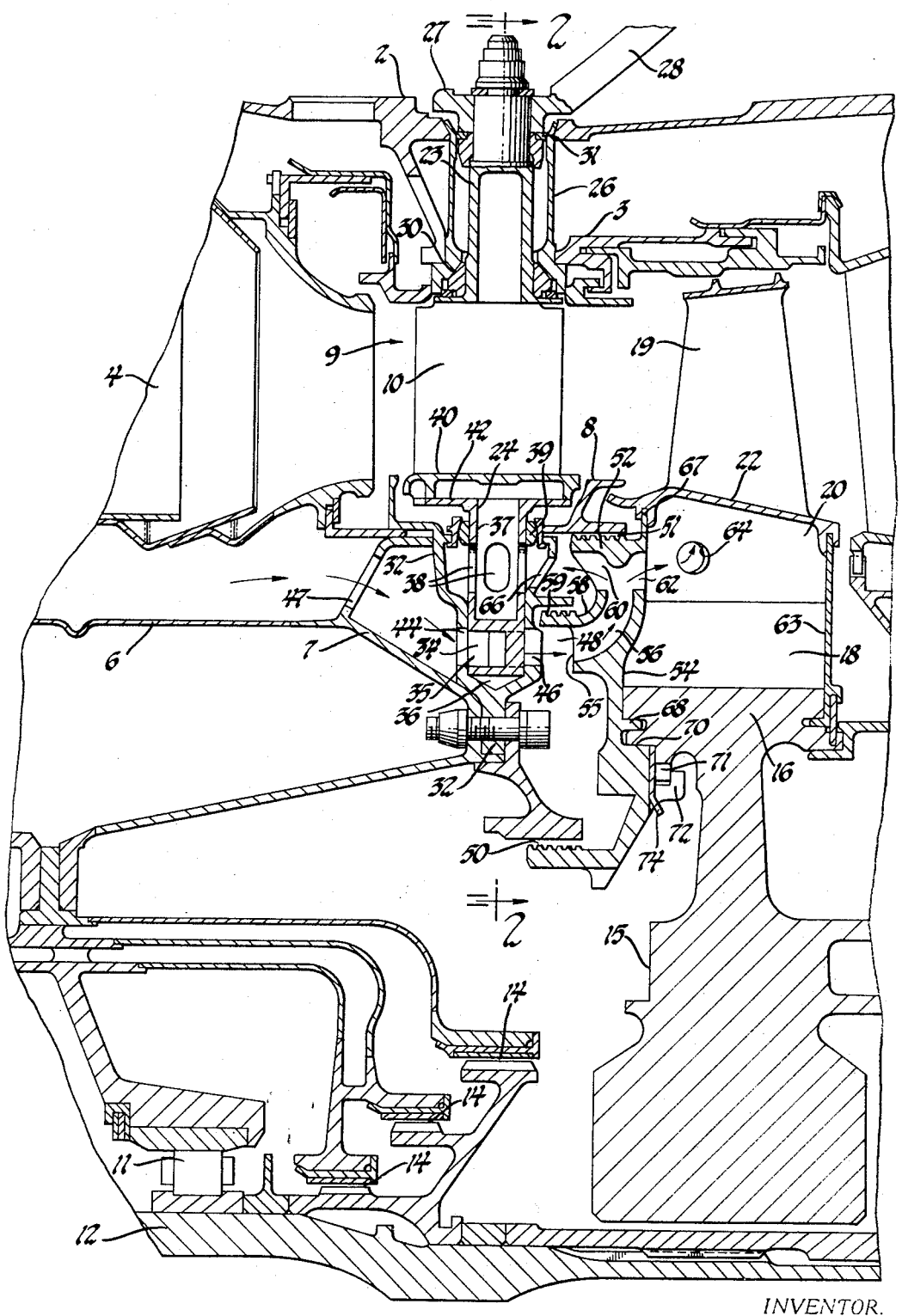
FIG. 1 is a partial sectional view through a turbine taken in a plane containing its axis of rotation.
Figure 2:
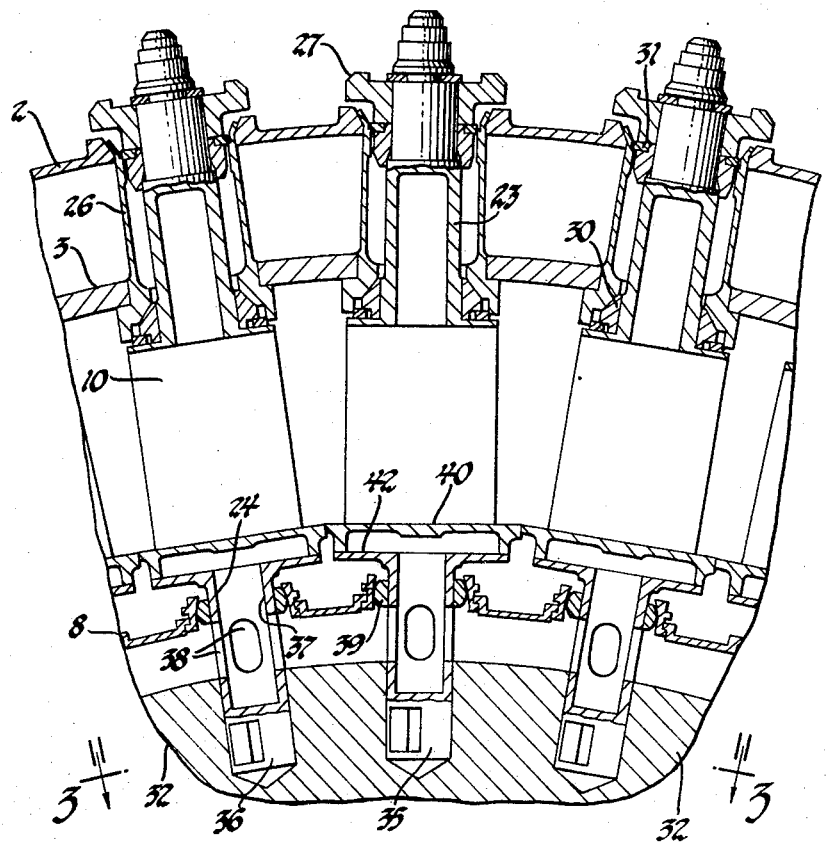
FIG. 2 is a transverse sectional view taken on the plane indicated by the line 2—2 in FIG. 1.

Proceeding now to the detailed description with reference to the drawings, the invention is embodied in the turbine of a gas turbine engine which includes a compressor (not illustrated), combustion apparatus, and a turbine housed in a casing 2. An inner casing or shroud 3 encircles the turbine and the outlet end of the combustion apparatus, indicated at 4. The combustion apparatus is further enclosed by an inner combustion space wall 6 which continues to a diaphragm 7 which, among other things, supports an inner shroud 8 of a first stage turbine nozzle 9. This nozzle includes the outer shroud 3 and an annular cascade of variable stagger angle (hereinafter called variable setting) vanes 10 which direct the flow from the combustion chamber to the first stage turbine rotor. The diaphragm 7 and associated structures support a bearing 11 within which is rotatively mounted the shaft 12 of the turbine. This structure also mounts a number of oil and gas seals 14, the details of which are immaterial to this invention.

The turbine includes a wheel 15 mounted on the shaft 12 by means not illustrated and which are immaterial to the present subject matter. Wheel 15 includes a rim 16 having dovetail slots for the roots 18 of an annular cascade of turbine rotor blades 19. Each blade includes a hollow stalk 20 joining it to the root and a platform 22 between the stalk and blade portion.

Considering now more specifically the structure of the turbine nozzle, the nozzle vanes 10 are hollow. Each vane is fixed to an outwardly extending hollow stem 23 and an inwardly extending hollow stem 24. The outer stem is journaled for rotation in a support 26 fixed in the casing 2 and shroud 3. An annular hub 27 integral with an arm 28 is keyed to the stem 23 and retained by a contracting snap ring. A conical bearing 30 mounts the stem for rotation and a piston ring seal is provided at 31.

The stem 24 is journaled in a support 32 bolted to the diaphragm 7. This support defines sockets 34 for the inner end portions 35 of the stems 24. The inner end portions are rotary valve plugs and the sockets define a valve body for each plug, together making up valves 36. The portion of stem 24 between the valve body and the vane is hollow and defines a passage 37 for vane cooling air which may enter this passage through ports 38 in the wall of stem 24. The inner shroud 8 is mounted on the support 32 and a seal 39 is provided between the shroud and the stem 24. Each vane 10 includes an inner vane shroud 40 which is fixed to a flange 42 at the end of shaft 24.

Figure 3:
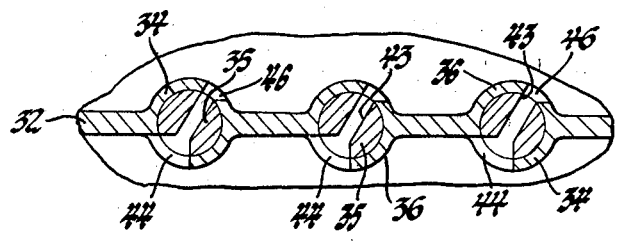
FIG. 3 is a partial developed sectional view taken on the plane indicated by the line 3—3 in FIG. 2.

The arms 28 are linked through a suitable unison ring (not illustrated) to an actuating means so that the stems 23 and vanes 10 may be rotated in unison to a desired extent, which is generally only a matter of 10 or 15 degrees, to vary the stagger angle or setting of the vanes and thereby vary the area of the nozzle and the outlet angle of the gas flow from the nozzle. As illustrated particularly in FIG. 3, each valve plug 35 defines a passage 43 diametrically through the plug and the sockets 34 define inlets 44 and outlets 46. As shown in the figures, the valves 36 are fully open. Let us assume in this case that the valves are fully open when the nozzle is fully open; that is, with minimum setting angles. As the vanes are rotated counterclockwise as viewed in FIG. 3 to increase the setting angle and decrease nozzle area, the plug 35 rotates clockwise to throttle the passage for flow of gas and, if desired, close it off entirely toward the limit of movement of the vanes. Thus, means for throttling air flow to the turbine which is responsive to vane setting angle is provided. It should be pointed out that, depending upon the particular installation, it may be desirable either to increase or decrease air flow with increase in nozzle area. This is a matter of engine design and of arrangement of the ports of the valves 36.

The cooling air which is employed in the embodiment described here is combustion chamber jacket air, that is, compressor discharge air which has flowed through the combustion apparatus outside the combustion liner or liners 4. This air flows through the diaphragm 7 by a ring of openings 47 as indicated by the arrows in FIG. 1, through the valves 36 to the rear side of the support 32, and into a space 48 between the support 32 and the turbine wheel. This space is closed off by a labyrinth seal at 50 defined by a member mounted on the diaphragm and a member mounted on the turbine wheel rim and is sealed off from the motive fluid path through the turbine by a labyrinth seal 51 between the inner shroud 8 and a ring 52 on the turbine wheel. The seal ring 52 forms a part of a ring 54 mounted on the forward face of the turbine wheel and extending from the labyrinth seal 50 to the platforms 22 of the blades.

The ring 54 includes a centrifugal fan 55 defined by generally radially extending blades 56 disposed between an arcuate forward surface of the ring 54 and a rotating outer shroud 58 integral with the blades. The shroud 58 lies immediately downstream of a seal ring portion 59 of the ring 54 which cooperates with a cylindrical sealing surface on the inner nozzle shroud 8 to define the radially outer boundary of space 48 or, in other words, the outer boundary of the passage between the valves 36 and the inlet to fan 55.

The blades 56 continue onwardly to the seal ring 52 which seals off the outlet from the fan from the motive fluid passage through the turbine. The ring 54 defines a baffle which bounds the outlet from the fan, defining a forward outlet 60 and a rearward outlet 62. The rearward outlet discharges air from the fan into the spaces between the blade stalks 20, the forward ends of which are closed by the ring 54 and the rearward ends are closed by an annular seal plate 63 mounted between the blade platforms and the wheel rim, the structure of which may be conventional.

The cooling air may flow through openings 64 in the hollow blade stalks and out into the hollow blades 19 from which it is discharged in any suitable manner into the motive fluid passage, serving by flow through or from the blades as a cooling medium for the blades 19. The air which is discharged through the forward outlet 60 from fan 55 flows through openings 66 in the rear wall portion of support 32 into the interior of the inner shroud structure and thence through the ports 38 into the stem of each nozzle vane. This air may cool the nozzle vane in any suitable manner.

It will be gathered from the foregoing that my invention is not concerned with the structure and arrangements for cooling within the vanes 10 and blades 19 nor within the wheel rim and inner shroud as such, but rather with the improved means for controlling, circulating, and distributing the cooling air to the vanes and blades.

Proceeding to details of the ring 54, this includes an outer marginal portion 67 received in slots in the inner surface of blade platforms 22, a rearwardly directed flange 68 which is lodged in a circumferential slot in the forward face of the wheel rim 16, and a circumferential shoulder 70 which bears against the inner surface of the rim. The ring 54 is retained axially on the turbine wheel by the engagement with the blade platform and also by a bayonet joint arrangement at the inner surface of the rim defined by lugs 71 on the wheel rim and 72 on the ring 54. These may pass each other for mounting of the ring 54, after which the ring is rotated to align the two sets of lugs that retain the ring against axial displacement. A bendable sheet metal lock device 74 may be deformed to prevent relative rotation of the ring 54 rim after the mounting is made, or any other suitable retention lock may be employed.

It should be clear from the foregoing to those skilled in the art that I have devised a system in which the flow of cooling air is modulated by valves which respond to the setting of the nozzle vanes which in turn is related to the performance level and need for cooling of the engine. The exact relation between nozzle vane angle and need for cooling may vary from one power plant to another and, therefore, the curve of open valve area to nozzle angle may have various shapes, depending upon the particular installation. The contour of the valve spool passage 43 and the arrangement of the valve entrance 44 and exit 46 may be varied to achieve any desired relation between vane setting angle and air passage area.

Air thus passed to the turbine is energized by the fan on the rotor and is then split between the stator vanes and rotor blades as needed for cooling. The proportioning between stator and rotor may be effected by the structures of the stator and rotor or by the configuration of the fan passages including the configuration of the outlet 60 and 62 of the fan 55.

The detailed description of preferred embodiments of the invention for the purpose of explaining the principles thereof is not to be considered as limiting or restricting the invention, as many modifications may be made by the exercise of skill in the art.

I claim:

1. A turbine comprising, in combination, a nozzle including vanes, a rotor including blades, a cooling fluid pumping impeller on the rotor, means on the rotor for directing a portion of the pumped cooling fluid to the nozzle and a portion to the rotor, and means on the nozzle operative to vary the setting of the vanes and concurrently throttle the supply of cooling fluid to the said impeller.

2. A turbine comprising, in combination, a nozzle including vanes, a rotor including blades, a cooling fluid pumping impeller on the rotor, means on the rotor for directing a portion of the pumped cooling fluid to the nozzle and a portion to the rotor, and means on the nozzle operative to vary the setting of the vanes and concurrently throttle the supply of cooling fluid to the said impeller including movable valve members coupled to the nozzle vanes for movement with the vanes as the setting is changed.

3. A turbine comprising, in combination, a nozzle including vanes, a rotor including blades, a fan on the rotor including a cooling fluid pumping impeller and outlet means on the fan effective to direct a portion of the pumped cooling fluid to the nozzle vanes and a portion to the rotor blades, and means on the nozzle operative to vary the setting of the vanes and concurrently throttle the supply of cooling fluid to the said fan.

4. A turbine comprising, in combination, a turbine nozzle including an annular cascade of vanes and a turbine rotor including an annular row of blades, the nozzle having means for concurrently rotating the vanes about spanwise axes for varying the nozzle configuration including stems extending from and rotating with the vanes, the nozzle including valves for controlling turbine cooling fluid, each said valve including a rotary valve member coupled to one of the said stems, and the rotor including a cooling fluid impelling fan having an inlet from the said valves and an outlet configured to split the cooling fluid flow between the said vanes and the said blades.

5. A turbine comprising an inlet for motive fluid, a nozzle including a cascade of variable stagger angle vanes for directing the fluid, a turbine rotor including blades energized by the fluid discharged from the nozzle, an inlet for a turbine cooling fluid, and a fan on the rotor for impelling the cooling fluid, in combination with valve means effective to control the flow of cooling fluid coupled to the said vanes so that the flow of cooling fluid is varied in accordance with the stagger angle of the vanes.

6. A turbine comprising an inlet for motive fluid, a nozzle including a cascade of variable stagger angle vanes for directing the fluid, a turbine rotor including blades energized by the fluid discharged from the nozzle, an inlet for a turbine cooling fluid, and a fan on the rotor for impelling the cooling fluid to the said vanes and blades, in combination with valve means effective to control the flow of cooling fluid to the said fan coupled to the said vanes so that the flow of cooling fluid is varied in accordance with the stagger angle of the vanes.

7. A turbine comprising an inlet for motive fluid, a nozzle including a cascade of variable stagger angle vanes for directing the fluid, a turbine rotor including blades energized by the fluid discharged from the nozzle, an inlet for a turbine cooling fluid, and a fan on the rotor for impelling the cooling fluid, in combination with valve means effective to control the flow of cooling fluid including rotary valve plugs fixed to the said vanes so that the flow of cooling fluid is varied in accordance with the stagger angle of the vanes.

* * * * *